United States Patent
Qiu et al.

(10) Patent No.: US 8,156,219 B2
(45) Date of Patent: Apr. 10, 2012

(54) SYSTEM AND METHOD OF HEALTH MONITORING AND FAULT MONITORING IN A NETWORK SYSTEM

(75) Inventors: Chaoxin Qiu, Austin, TX (US); Jeffrey Scruggs, Round Rock, TX (US); Robert Dailey, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 823 days.

(21) Appl. No.: 11/833,661

(22) Filed: Aug. 3, 2007

(65) Prior Publication Data

US 2009/0037573 A1    Feb. 5, 2009

(51) Int. Cl.
   *G06F 15/173*    (2006.01)
(52) U.S. Cl. ............... 709/224; 714/4; 714/31
(58) Field of Classification Search ........... 709/201, 709/205–207, 220–226, 217, 328; 714/1, 714/4, 10, 20–21, 23, 41, 47, 48, 31; 707/200; 455/419
   See application file for complete search history.

(56) References Cited

U.S. PATENT DOCUMENTS

| | | | | |
|---|---|---|---|---|
| 5,805,785 A * | 9/1998 | Dias et al. | ............ | 714/4 |
| 5,926,619 A * | 7/1999 | Badovinatz et al. | ............ | 714/4 |
| 6,820,221 B2 * | 11/2004 | Fleming | ............ | 714/31 |
| 6,934,880 B2 * | 8/2005 | Hofner | ............ | 714/10 |
| 7,051,098 B2 * | 5/2006 | Masters et al. | ............ | 709/224 |
| 7,155,512 B2 * | 12/2006 | Lean et al. | ............ | 709/224 |
| 7,305,550 B2 * | 12/2007 | Oliver et al. | ............ | 713/156 |
| 7,379,461 B2 * | 5/2008 | Wu et al. | ............ | 370/395.2 |
| 7,383,439 B2 * | 6/2008 | Price et al. | ............ | 713/170 |
| 7,523,197 B2 * | 4/2009 | Castaneda et al. | ............ | 709/224 |
| 7,590,736 B2 * | 9/2009 | Hydrie et al. | ............ | 709/226 |
| 7,590,898 B2 * | 9/2009 | Coekaerts | ............ | 714/48 |
| 2003/0158936 A1 * | 8/2003 | Knop et al. | ............ | 709/224 |
| 2003/0177283 A1 * | 9/2003 | Hamilton et al. | ............ | 709/328 |
| 2004/0153525 A1 * | 8/2004 | Borella | ............ | 709/217 |
| 2006/0069702 A1 * | 3/2006 | Moeller et al. | ............ | 707/200 |
| 2006/0123119 A1 * | 6/2006 | Hill et al. | ............ | 709/227 |
| 2007/0067663 A1 * | 3/2007 | Surasinghe | ............ | 714/4 |
| 2007/0180077 A1 * | 8/2007 | Letca et al. | ............ | 709/223 |
| 2007/0282988 A1 * | 12/2007 | Bornhoevd et al. | ............ | 709/223 |
| 2008/0026740 A1 * | 1/2008 | Netanel | ............ | 455/419 |
| 2009/0006885 A1 * | 1/2009 | Pattabhiraman et al. | ............ | 714/4 |

\* cited by examiner

*Primary Examiner* — Dustin Nguyen
(74) *Attorney, Agent, or Firm* — Toler Law Group, PC

(57) ABSTRACT

A method of monitoring a network is disclosed and includes receiving an enrollment message at a heartbeat manager from a heartbeat agent associated with a first application stored at a first network entity. The method also includes automatically associating a heartbeat interval with the first application based at least partially on the enrollment message. In another embodiment, a system of monitoring a network is disclosed and includes a network entity having processing logic and memory accessible to the processing logic. The memory stores an application including a heartbeat agent portion having instructions executable by the processing logic to enroll with a heartbeat management server communicating with the network entity and including a heartbeat monitor including instructions to subscribe to notifications indicating an operational status of an application residing at a second network entity.

28 Claims, 6 Drawing Sheets

SYSTEM AND METHOD OF HEALTH MONITORING AND FAULT MONITORING IN A NETWORK SYSTEM

FIELD OF THE DISCLOSURE

The present disclosure is generally related to health monitoring and fault mitigation in a network system.

BACKGROUND

In a large network-based service environment, such as a Voice-over Internet Protocol (VoIP) network, an end-to-end service establishment may consist of execution of several applications. One such application may run on a subset of network elements and may have dependency on a subset of other applications that run on a subset of other network elements. Failure of one such application or a network element can result in delays or failure of service processing, which may not be tolerable due to the real-time nature of the communication service.

Mechanisms can be deployed by applications to detect failures of dependent applications or of hosting network elements. However, as the size of a network grows and as more vendors contribute their products to the network, operational status communications grow in proportion to the square of the number of network elements. This can contribute to significant overhead. In addition, application dependency is typically not symmetric and fully meshed, leading to manual configuration of each individual application or network element to monitor remote peers. This can place significant operational burdens on network administrators. Moreover, incompatibility and interoperability problems in a multi-vendor and multi-technology environment can prevent network service providers from implementing such monitoring consistently throughout a network. Hence, there is a need for an improved system and method of health monitoring and fault mitigation in a network system.

DETAILED DESCRIPTION OF THE DRAWINGS

A system to monitor health and mitigate faults in a network system is disclosed and includes a heartbeat management system having processing logic and memory accessible to the processing logic. The memory includes instructions executable by the processing logic to receive a subscription message from a heartbeat agent associated with a first application communicating with the heartbeat management system. The subscription message indicates at least one class of applications to be monitored on behalf of the first application. The memory also includes instructions to notify the first application of the operational status of each application included in the at least one class of applications.

In another embodiment, a system to monitor health and mitigate faults in a network system is disclosed and includes a network entity having processing logic and memory accessible to the processing logic. The memory stores an application including a heartbeat agent portion having instructions executable by the processing logic to enroll with a heartbeat management server communicating with the network entity and including a heartbeat monitor portion including instructions to subscribe to notifications indicating an operational status of an application residing at a second network entity.

In another embodiment, a method of health monitoring and fault mitigation in a network system is disclosed and includes receiving an enrollment message at a heartbeat manager from a heartbeat agent associated with a first application stored at a first network entity. The method also includes automatically associating a heartbeat interval with the first application based at least partially on the enrollment message.

In another embodiment, a method of health monitoring and fault mitigation in a network system is disclosed and includes sending an enrollment request from a first application to a heartbeat management system. The method also includes receiving an enrollment response from a heartbeat manager associated with the heartbeat management system. The enrollment response indicates a heartbeat interval automatically associated with the first application.

In another embodiment, a computer-readable medium is disclosed and includes processor-readable instructions adapted to cause a processor to execute a method comprising enrolling an application residing at a network entity with a heartbeat management service in response to an enrollment request received from a heartbeat agent associated with the application and monitoring a class of other applications in response to a subscription message received from a heartbeat monitor portion associated with the application. The subscription message indicates that the class of applications is to be monitored on behalf of the application.

Figure 1A:
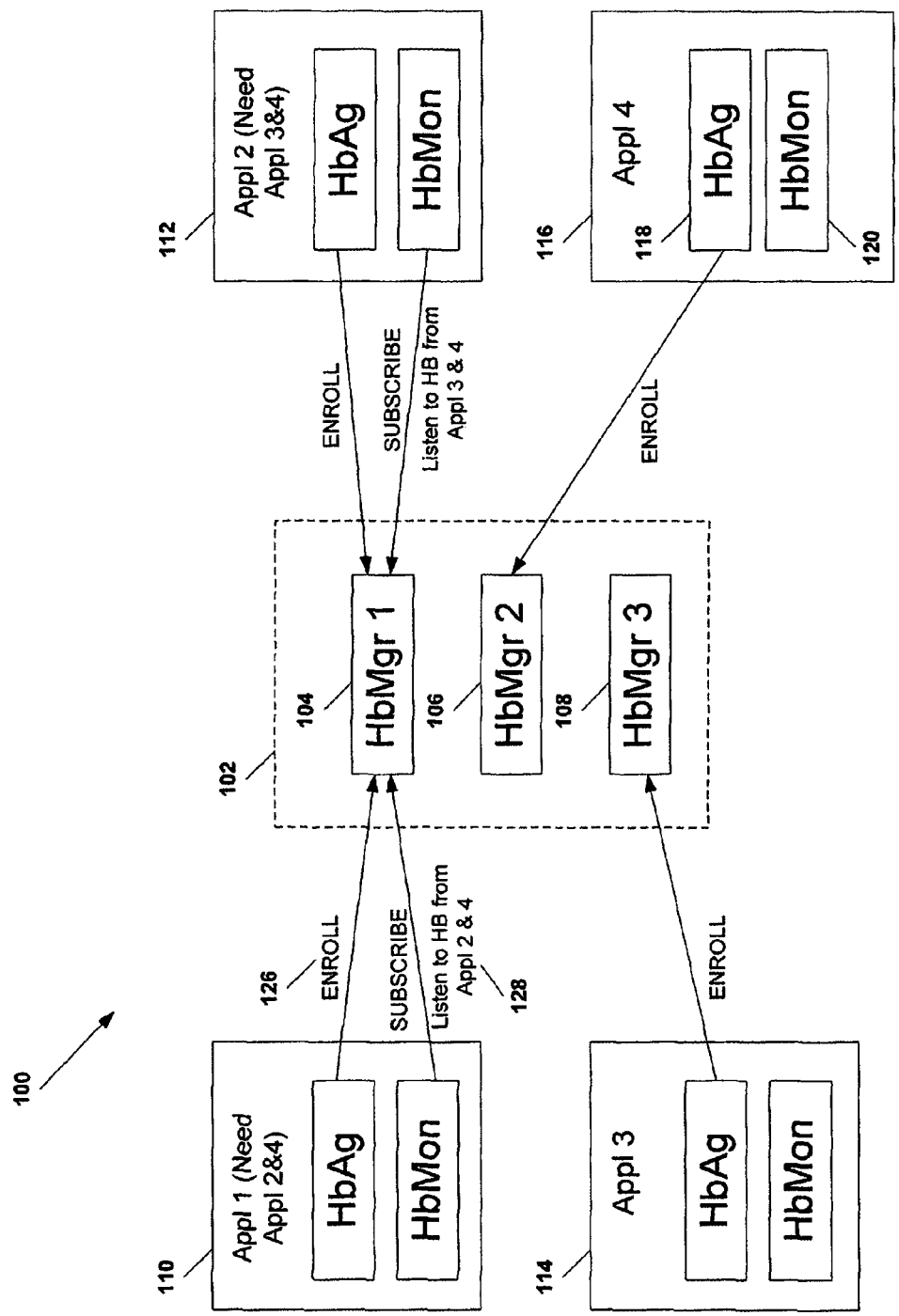
FIG. 1A is a block diagram of a particular embodiment of a system to monitor health and mitigate faults in a network system.

Referring to FIG. 1A, a particular embodiment of a system to monitor health and mitigate faults in a network system is illustrated and designated generally 100. The system 100 includes a heartbeat management system 102 having a plurality of heartbeat managers, such as the heartbeat managers 104-108. The heartbeat managers 104-108 can be co-located, for example, at a heartbeat management server. Alternatively, the heartbeat managers 104-108 can be distributed among a plurality of heartbeat management servers or systems to provide geographic redundancy, for example.

The heartbeat management system 102 communicates with a plurality of applications 110-116, such as elements of a distributed application, distributed service, or distributed operating system. For instance, the applications 110-116 can be stored at one or more servers of a server clustering system or at network entities associated with a Voice-over Internet Protocol (VoIP) network or another type of network. Each application can include a heartbeat agent 118 and a heartbeat monitor 120, which can be integrated with the application prior to being loaded onto a network entity or after the network entity is added to a network communicating with the heartbeat management system 102. The heartbeat agent 118 and the heartbeat monitor 120 can be configured with fully qualified domain names (FQDNs) and Internet Protocol (IP) addresses of all heartbeat manager instances 104-108.

When each application is added to the network, its heartbeat agent 118 can send an enrollment request 126 to the heartbeat management system 102. The enrollment request 126 can include, for example, data indicating the name of the application, an application class associated with the application, a service that the application provides, an application instance fully qualified domain name (FQDN), an application instance IP address, an enrollment action (e.g., CREATE, MODIFY, DELETE), a proposed heartbeat interval in milliseconds or other units at which the operational status of the application is to be obtained or determined by the heartbeat management system 102, or any combination thereof.

In response to the enrollment request 126, the heartbeat management system 102 can automatically enroll the application with a heartbeat management service and automatically assign a heartbeat interval to the application, where the heartbeat agent 118 associated with the application is to send a HELLO message, or other heartbeat signal or operational status message, to the heartbeat management server 102 at each instance of the heartbeat interval. Further, the heartbeat management system 102 can designate one of the heartbeat managers 104-108 to communicate an enrollment response to the heartbeat agent 118. The enrollment response can indicate that enrollment succeeded or failed. The enrollment response can also identify the heartbeat manager communicating the enrollment response to the heartbeat agent 118. If the enrollment succeeds, the enrollment response can indicate the assigned heartbeat interval, such as // hrtBtInterval=
// min(maxHrtBtInterval, max(minHrtBtInterval, proposedHrtBtInterval))

A heartbeat agent 118 can treat an enrollment as successful after at least one heartbeat manager responds positively.

An enrolled application can request that the operational status of zero or more of other enrolled applications 110-116 be reported to the requesting application. For example, a heartbeat monitor 120 associated with the requesting application can send a subscription message 128 to the heartbeat management system 102 requesting periodic notifications of the operational status of other applications. In an illustrative embodiment, the heartbeat monitor associated with the first application 110 can send a subscription message requesting that the second application 112 and the fourth application 116 be monitored on behalf of the first application 110. In another example, the heartbeat monitor associated with the second application 112 can send a subscription message requesting that the third application 114 and the fourth application 116 be monitored. On the other hand, the third application 114 and the fourth application 116 might not request monitoring of any other applications.

In a particular embodiment, each application can indicate upon enrollment that it is a member of a particular application class, and a subscription message can request notifications regarding one or more application classes. In another embodiment, a subscription message 128 can identify specific other applications to be monitored. In yet another embodiment, the subscription message 128 can identify one or more services to be monitored, where one or more other applications are associated with such services. In an illustrative embodiment, the subscription message 128 can also include the subscribing application name, the subscribing application instance FQDN, the subscribing application instance IP address, a subscription action (e.g., CREATE, MODIFY, DELETE), or any combination thereof.

In response to the subscription message 128, the heartbeat management system 102 can assign a notification rule to the application whose heartbeat monitor 120 has sent the subscription message 128. The notification rule can indicate that the heartbeat monitor 120 is to be notified regarding operational status of other applications, services, or classes of applications identified in the subscription message 128. As a result, the notification rules will not be identical for all applications 110-116 in the network, in some embodiments. Each notification rule may also include a monitoring interval at which notifications are to be aggregated and sent to the heartbeat monitor 120 of the associated application. The heartbeat management system 102 can synchronize enrollment and subscription data associated with each application among a plurality of the heartbeat managers 104-108 associated with the heartbeat management system 102, such as all heartbeat managers that can communicate, or that are likely to communicate, with the application. At least one heartbeat manager can respond to the application indicating that subscription was successful. The subscription response can also include an identification of the responding heartbeat manager, a maximum heartbeat interval, a minimum heartbeat interval, a notification interval, or any combination thereof.

Figure 1B:
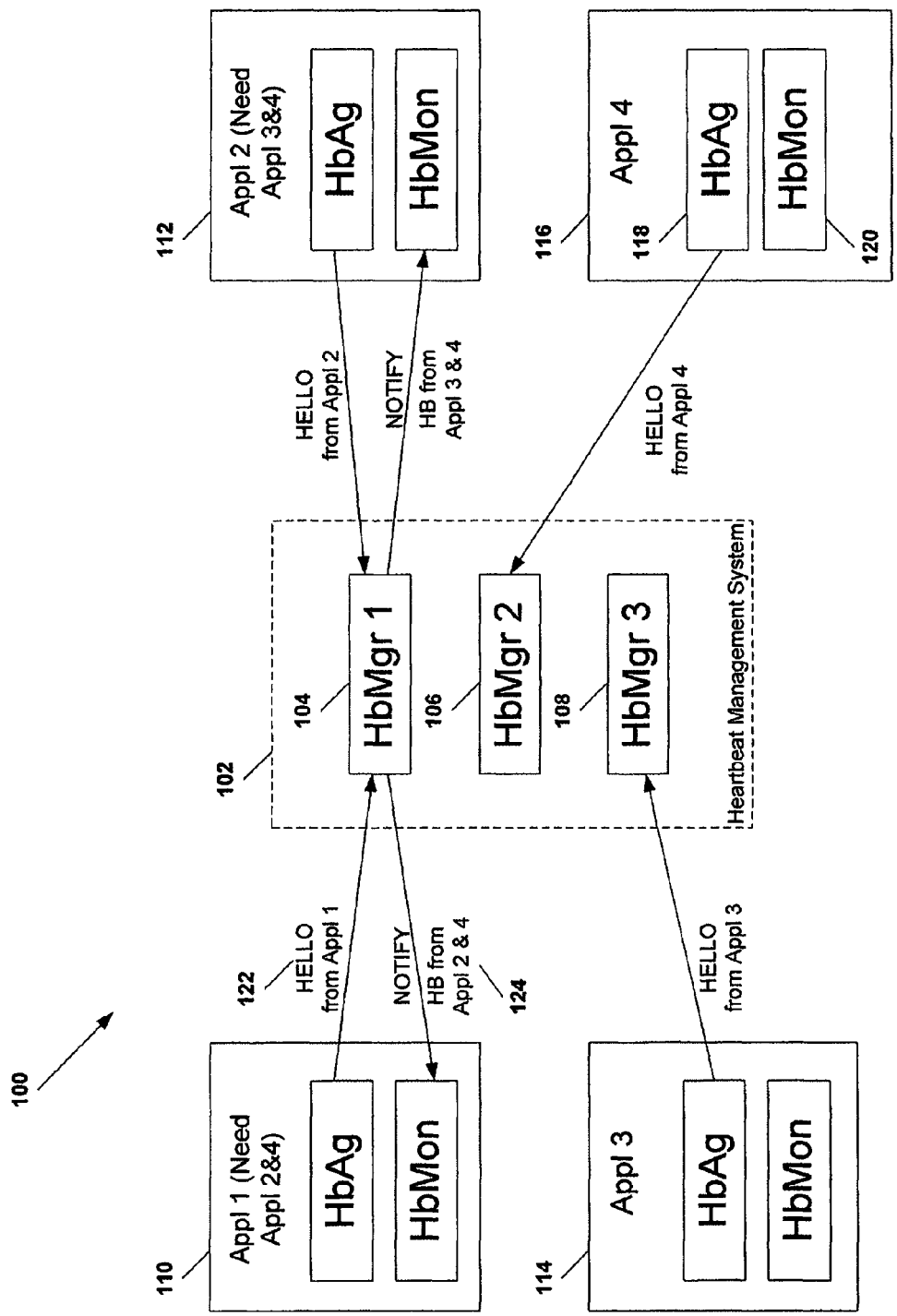
FIG. 1B is a block diagram further illustrating the particular embodiment of a system to monitor health and mitigate faults in a network system shown in FIG. 1A.

FIG. 1B further illustrates the system shown in FIG. 1A. When one-half of a heartbeat interval associated with a particular application has elapsed, the heartbeat agent 118 associated with the particular application can send a message, such as a HELLO message 122 or other heartbeat signal, to the heartbeat management system 102 indicating that the particular application is operational. The HELLO message 122 can include a name of a service provided by the reporting application, an application name, an application instance FQDN, an application instance IP address, a message identification, such as a HELLO message sequence identifier, or any combination thereof. The heartbeat agent 118 can send additional HELLO messages 122 after one-half of the heartbeat interval has elapsed since a previous HELLO message 122 was sent.

In a particular embodiment, the heartbeat agent 118 can multicast or unicast the HELLO message 122 to a plurality of the heartbeat managers 104-108, for instance, where HELLO data is not synchronized among the heartbeat managers 104-108. In an illustrative, non-limiting embodiment, one or more of the heartbeat managers 104-108 can monitor time for the heartbeat interval and can prompt the heartbeat agent for operational status if a heartbeat signal is not received.

The heartbeat managers 104-108 can send notification messages 124 to the heartbeat monitors of applications that have subscribed to notifications regarding other applications. Each notification indicates that a particular application is operational. In an illustrative embodiment, a notification message 124 can indicate one or more most recent heartbeat intervals at which a heartbeat manager received, or did not receive, a HELLO message 122 from the particular application. For example, a notification message 124 sent to the first application 110 can indicate that HELLO messages were received from each of the second application 112 and the fourth application 116 at the three most recent heartbeat intervals associated with each of the applications 112, 116. In an illustrative embodiment, the notification message 124 can indicate that HELLO messages were received from each application of a particular application class, where the second application 112 and the fourth application 116 are included in the particular application class. A notification message can also include a heartbeat manager identification. Where a notification indicates a list of monitored services, a list of application instances within each service can indicate an application name, an application instance FQDN, an application instance IP address, a plurality of most recent heartbeat times, or any combination thereof. A notification message 124, which may be included in an aggregated plurality of notification messages, can be sent to a heartbeat monitor 120 of each subscribed application at a monitoring interval associated with the application.

In one embodiment, a heartbeat monitor can receive a notification message regarding an application from one of the heartbeat managers 104-108 or from a plurality of the heartbeat managers 104-108. For instance, if a heartbeat agent associated with a particular application multicasts a HELLO message to all of the heartbeat managers 104-108, a heartbeat monitor that is monitoring the particular application may receive notifications from all of the heartbeat managers 104-108. The heartbeat monitor may treat the particular application as operational if at least one heartbeat manager sends a notification indicating the receipt of a HELLO message from the heartbeat agent of the particular application. In an illustrative embodiment, HELLO messages and notification messages can utilize a hypertext transfer protocol (HTTP), an extensible markup language (XML), or a combination thereof.

Those skilled in the art will appreciate that one or more functions associated with the heartbeat agent may be allotted to the heartbeat monitor without departing from this disclosure. Similarly, one or more functions associated with the heartbeat monitor may be allotted to the heartbeat agent without departing from this disclosure. In still other embodiments, the heartbeat agent and heartbeat monitor may represent aspects of a single utility, add-on, or other computer program integrated with or associated with an application.

Figure 2:
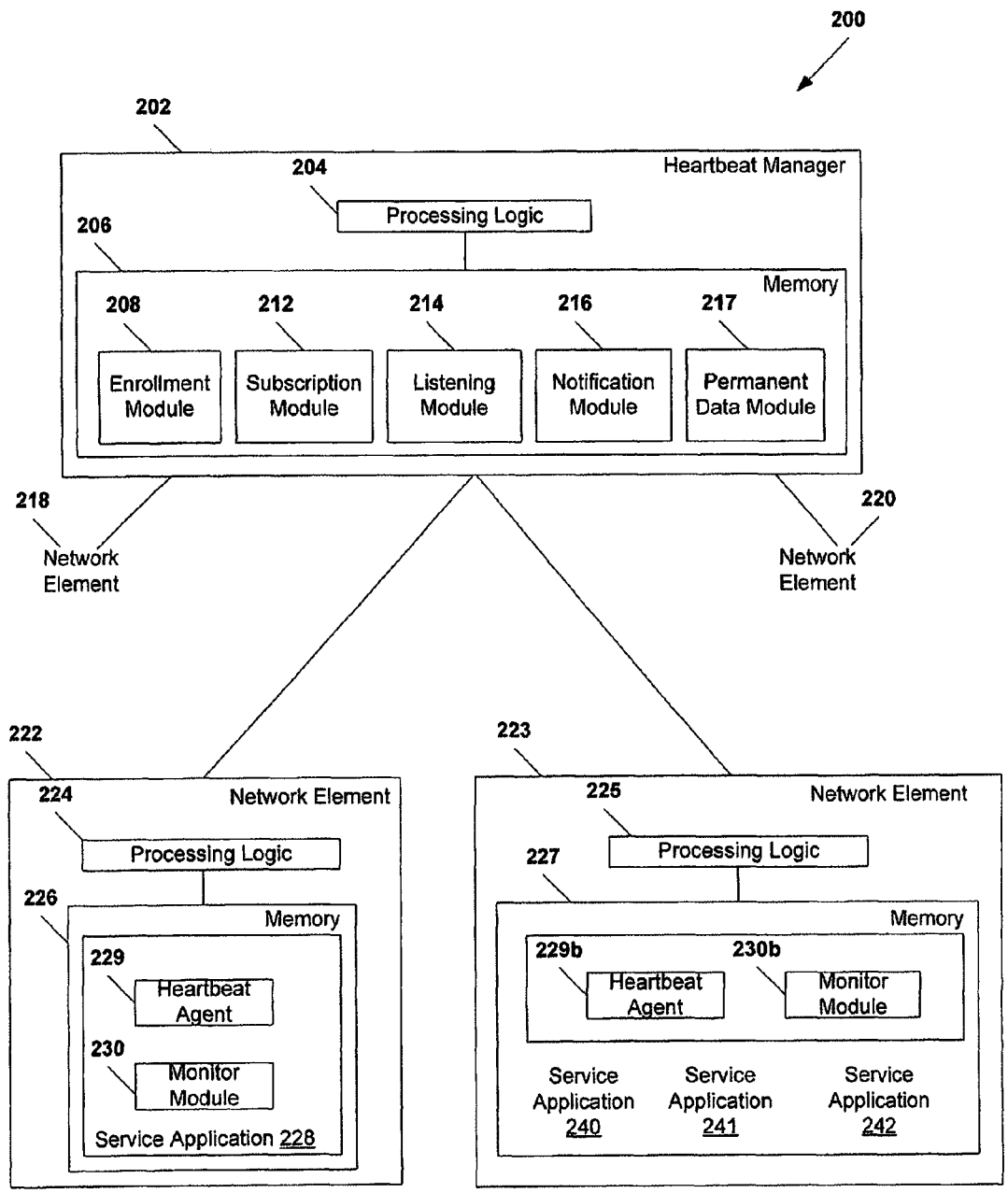
FIG. 2 is a block diagram of a second particular embodiment of a system to monitor health and mitigate faults in a network system.

Referring to FIG. 2, a second particular embodiment of a system to monitor health and mitigate faults in a network system is illustrated and designated generally 200. The system 200 includes a heartbeat manager 202 that communicates with a plurality of network elements 218-223, such as a plurality of servers or other devices that require communication to achieve a service or other task. The heartbeat manager 202 can include one instance of a plurality of heartbeat managers. The plurality of heartbeat managers can be co-located at a single heartbeat management server or can be distributed, such as a plurality of geographically redundant heartbeat managers. Each heartbeat manager can monitor, record and communicate operational status data with respect to applications residing at one or more of the plurality of network elements 218-223.

In an illustrative embodiment, each network element, such as the network element 222, can include processing logic 224 and memory 226 accessible to the processing logic 224. The memory 226 can store one or more service applications 228 that are executable by the processing logic 224 to provide services, or a portion of a distributed service, to terminal devices, other network entities, or a combination thereof. In addition, the memory 226 can store a heartbeat agent module 229 and a monitor module 230, which can be integrated with the service application 228. In one embodiment, the heartbeat agent module 229 and the monitor module 230 can each be configured with the fully qualified domain name (FQDN), Internet Protocol (IP) address, or any combination thereof, of each of a plurality of heartbeat manager instances with which the heartbeat agent module 229 communicates.

In another illustrative embodiment, at least one of the network elements, such as the network element 223, can include processing logic 225 and memory 227 accessible to the processing logic 225. The memory 227 can include a heartbeat agent 229b and a monitor module 230b, which are independent from (i.e., not integrated with) service applications 240-242 stored at the memory 227. For example, a server vendor may implement the heartbeat agent 229b and the monitor module 230b as add-ons to one or more operating systems, and the service applications 240-242 can include an interface (e.g., HTTP, XML, vendor API, etc.) to communicate with the heartbeat agent 229b and the monitor module 230b.

After a network element, such as the network element 222, is added to a network service that includes one or more heartbeat managers, such as the heartbeat manager 202, the heartbeat agent module 229 is executable by the processing logic 224 to send an enrollment request message to the heartbeat manager 202. The enrollment request message can include, for instance, data indicating the name of the service application 228, a service that the service application 228 provides, an application instance fully qualified domain name (FQDN), an application instance IP address, an enrollment action (e.g., CREATE, MODIFY, DELETE), a proposed heartbeat interval in milliseconds or other units at which the operational status of the service application 228 is to be obtained or determined by the heartbeat manager 202, or any combination thereof. In an illustrative embodiment, the enrollment request message can identify an application class associated with the service application 228.

In a particular embodiment, the heartbeat agent module 229 is executable by the processing logic 224 to retry an enrollment request until at least one enrollment response is received. Further, the heartbeat agent module 229 can be executable by the processing logic 224 to generate an alert to an administrator system when an enrollment response is not received after a pre-defined number of tries, or when an enrollment failure is indicated in an enrollment response.

In a particular embodiment, the heartbeat agent module 229 is executable by the processing logic 224 to send operational status messages to the heartbeat manager 202. For example, after the heartbeat agent 229 receives a successful enrollment response message, the heartbeat agent 229 can be executable by the processing logic 224 to send HELLO messages after one-half of a heartbeat interval provided in the enrollment response has elapsed since last transmission of a HELLO message (or since enrollment, in the case of a first HELLO message). A HELLO message can indicate an identity of the service application 228 whose operational status is being reported; a service name; an application instance FQDN; an application instance IP address; that the service application 228 is operational; other information; or any combination thereof. In an illustrative embodiment, data indicating that the service application 228 is operational can include a HELLO message sequence identifier.

The monitor module 230 can be executable by the processing logic 224 to send a subscription message to the heartbeat manager 202. The subscription message can indicate the name of one or more service applications at one or more other servers to be monitored on behalf of the heartbeat agent 229. Alternatively, the subscription message can indicate one or more services or classes of applications to be monitored on behalf of the heartbeat agent 229. The subscription message can include additional information identifying the subscribing application name; the subscribing application instance FQDN; the subscribing application instance IP address; a subscription action, such as CREATE, MODIFY or DELETE; or any combination thereof. Where the subscription action is MODIFY, the application instance FQDN, application instance IP address, or a combination thereof can be modified at the heartbeat manager 202 and at other heartbeat managers as a result of the subscription message.

In a particular embodiment, the monitor module 230 is executable by the processing logic 224 to retry a subscription request until at least one subscription response is received. Further, the monitor module 230 can be executable by the processing logic 224 to generate an alert to an administrator system when a subscription response is not received after a pre-defined number of tries, or when a subscription failure is indicated in a subscription response. After a successful subscription response is received, the monitor module 230 can be executable by the processing logic 224 to receive notifications from the heartbeat manager 202 indicating an operational status of one or more service applications running at other servers, such as servers at the other network elements 218, 220.

In response to the receipt of a notification message, the monitor module 230 can be executable by the processing logic 224 to extract a list of the services and associated application instances from the notification message, together with a plurality of times at which heartbeat signals were received for each of the application instances. The monitor module 230 can be executable by the processing logic 224 to pass the information in an XML message to the service application 228. When notification messages regarding the same application instances are received from multiple heartbeat managers, the monitor module 230 can be executable by the processing logic 224 to apply an "OR" operation to duplicated information. In a particular embodiment, a monitored application instance for a monitored service can be considered healthy if at least one heartbeat manager reports receipt of recent heartbeats.

In a particular embodiment, the heartbeat manager 202 can include processing logic 204 and memory 206 accessible to the processing logic 204. The memory 206 can include a plurality of modules 208-217 that provide various functions of the heartbeat manager 202. The plurality of modules 208-217 can include hardware logic, instructions executable by the processing logic 204, or a combination thereof.

In one embodiment, the plurality of modules 208-217 can include software instructions embodied within one or more computer programs stored within the memory 206.

In a particular embodiment, the memory 206 can include a permanent data module 217, such as a non-volatile local data store, to store permanent data objects that are read in when the heartbeat manager 202 boots up. A computational data structure can be constructed from such data objects. For instance, the permanent data module 217 can store a service dictionary that identifies services within the IP network architecture. The service dictionary can be created and maintained by a privileged system operator and can be shared and synchronized across platforms by network operation procedures. The service dictionary can include, for example, an alphabetical or otherwise organized list of services, each service pointing to a list of enrolled service applications. Each service can also point to a list of subscribed applications monitoring the operational status of the service or of applications included in the service. In an illustrative, non-limiting embodiment, the permanent data module 217 can be implemented using a Database Management system (DBMS) having the following schema:

```
serviceDictionary is a (performance optimized) list of
    serviceObject {
    serviceName;
    maxHrtBtInterval;
    minHrtBtInterval;
    }
// permanent dictionary managed by admin
listServiceMonitor is a (performance optimized) list of
    serviceMonitor {
        monitoringApplicationInstance;
```

-continued

```
        monitoringApplicationFQDN;
        monitoringApplicationIPaddress;
            // FQDN or IP address or both, at least one should present
        notifyHrtBtInterval; // = min(maxHrtBtInterval, all services
in the following list)
        listMonitoredServices {
            pointer to serviceApplGroup objects in listServiceMember;
            }
        }    // created when a HbMon subscribes on behalf of its
application,
            // permanent till modified or deleted by the same HbMon
    // listServiceMonitor is a two-dimensional list indexed by
    //            (monitoringApplicationInstance, serviceName)
listServiceMember is a (performance optimized) list of
    serviceApplGroup {
        serviceName;    //defined in serviceDictionary
        listServiceAppl;
        }
    // listServiceMember is a two-dimensional list, indexed by
(serviceName, applicationInstance)
listServiceAppl is a (performance optimized) list of
    serviceAppl {
        applicationInstance;
        applicationFQDN;
        applicationIPaddress;    // FQDN or IP address or both, at
least one should present
        hrtBtInterval;    // HbAg negotiates a HB interval within
the predefined [min, max] window
        mostRecentHbTime;    // Time stamp for the most recent HB
received
        secondRecentHbTime; // Time stamp for the second most
recent HB
        thirdRecentHbTime;    // Time stamp for the third most
recent HB
        }    // created when a HbAg enrolls on behalf of its
application,
```

In a particular embodiment, the memory 206 can include an enrollment module 208 that is executable by the processing logic 204 to receive enrollment request messages from each of the plurality of network elements 218-222. In addition, the enrollment module 208 can be executable by the processing logic 204 to send enrollment response messages to the network elements 218-222. Enrollment response messages can include, for example, an indication of whether enrollment succeeded or failed; an identification of the heartbeat manager 202 communicating with the heartbeat agent 229; a heartbeat interval; other information; or any combination thereof. In an illustrative, non-limiting embodiment, a heartbeat interval can be represented as min(maxHrtBtInterval, max(minHrtBtInterval, proposedHrtBtInterval)), where the proposedHrtBtINterval object corresponds to a proposed heartbeat interval included in an enrollment request. Each heartbeat manager calculates heartbeat intervals according to a common protocol, such that, where a plurality of heartbeat managers each returns an enrollment response to the heartbeat agent 229, the heartbeat managers return the same heartbeat interval.

In an illustrative embodiment, the enrollment module 208 is executable by the processing logic 204 to return a failed enrollment response if a service name specified in an enrollment request is not in a service dictionary stored at the heartbeat manager 202; if an application name specified in the enrollment request is NULL; if a FQDN and IP address specified in the enrollment request is NULL; or if a service application object to be modified or deleted according to the enrollment request cannot be located. If enrollment does not fail, the enrollment module 208 is executable by the processing logic 204 to perform one of a plurality of actions, based on the action identified in an enrollment request.

For example, where the action contains a CREATE indicator, the enrollment module 208 can be executable by the processing logic 204 to create a new service application object (e.g., "serviceAppl") and add the new service application object to a list of service applications of a service application group identified by a service name in the enrollment request. In another example, where the action contains a MODIFY indicator, the enrollment module 208 can be executable by the processing logic 204 to locate a service application object in a list of service applications of a service application group identified by a service name in the enrollment request and to modify relevant information of the service application object. For instance, the application instance FQDN, application instance IP address, proposed heartbeat interval, or any combination thereof, can be modified. In a further example, where the action contains a DELETE command, the enrollment module 208 is executable by the processing logic 204 to locate a service application object in a list of service applications of a service application group identified by a service name in the enrollment request and to delete the service application object.

The memory 206 can also include a subscription module 212 that is executable by the processing logic 204 to receive subscription messages from the plurality of network elements 218-222 and to send subscription response messages to the plurality of network elements 218-222. A subscription response message from the heartbeat manager 202 can indicate, for example, whether a subscription succeeded or failed, identification information related to the heartbeat manager, a heartbeat interval at which the operational status of a service requested to be monitored will be determined, a notification interval at which notification messages will be sent to the monitor module 230, or any combination thereof. The subscription module 212 can also be executable by the processing logic 204 to assign and store a notification rule associated with an application based on a subscription message received from the heartbeat agent associated with the application.

In an illustrative embodiment, the subscription module 212 is executable by the processing logic 204 to return a failed subscription response if a service name specified in an subscription request is not in a service dictionary stored at the heartbeat manager 202; if an application name specified in the subscription request is NULL; if a FQDN and IP address specified in the subscription request is NULL; or if a service application object to be modified or deleted according to the subscription request cannot be located. If a subscription does not fail, the subscription module 212 can be executable by the processing logic 204 to perform one of a plurality of actions, based on the action identified in a subscription request.

For example, where the action contains a CREATE indicator, the subscription module 212 can be executable by the processing logic 204 to create a new service monitoring object (e.g., "serviceMonitor") and add the new service monitor object to a list of service monitor objects of a service application group identified by a service name in the subscription request. A pointer to the service monitor object can also be added to a monitored service list. In another example, where the action contains a MODIFY indicator, the subscription module 212 is executable by the processing logic 204 to locate a service monitor object in a list of service monitor objects and to modify a FQDN, IP address, or any combination thereof, related to a heartbeat monitor specified by the subscription request. In a further example, where the action contains a DELETE command, the subscription module 212 is executable by the processing logic 204 to locate a service monitor object in a list of service monitor objects of a service application group identified by a service name in the subscription request and to delete the pointer to the service monitor object.

Further, the memory 206 can include a listening module 214 that is executable by the processing logic 204 to receive operational status messages, such as a HELLO message, from applications at the network elements 218-222 that have enrolled with the heartbeat manager 202. In response to receiving a HELLO message or similar message, the listening module 214 can be executable by the processing logic 204 to stop and abort the message if a service name specified in the HELLO message is not in the serviceDictionary stored at the heartbeat manager 202; if an application name specified in the HELLO message is NULL; if the application FQDN and application IP address are NULL; or if a service application object specified in the HELLO message cannot be located. Otherwise, the listening module 214 can be executable by the processing logic 204 to locate the service application object in an appropriate service application object list of the service application group identified by a service name in the HELLO message. In an illustrative embodiment, times at which heartbeat signals have been received from the service application can be reset in response to the HELLO message, such as:

thirdRecentHbTime:=secondRecentHbTime;
secondRecentHbTime:=mostRecentHnTime;
mostRecentHbTime:=current system time;

In addition, the memory 206 can include a notification module 216 that is executable by the processing logic 204 to send notifications to the network elements 218-222 based on notification rules associated with applications residing at such network elements, where the notifications indicate operational status of other applications. In an illustrative embodiment, a notification message can include an identifier of the heartbeat manager 202; a list of services for which operational status is being reported; a list of application instances within each service; and, for each application instance, a name, FQDN, IP address, and a plurality of most recent times at which a heartbeat signal was received.

Figure 3:
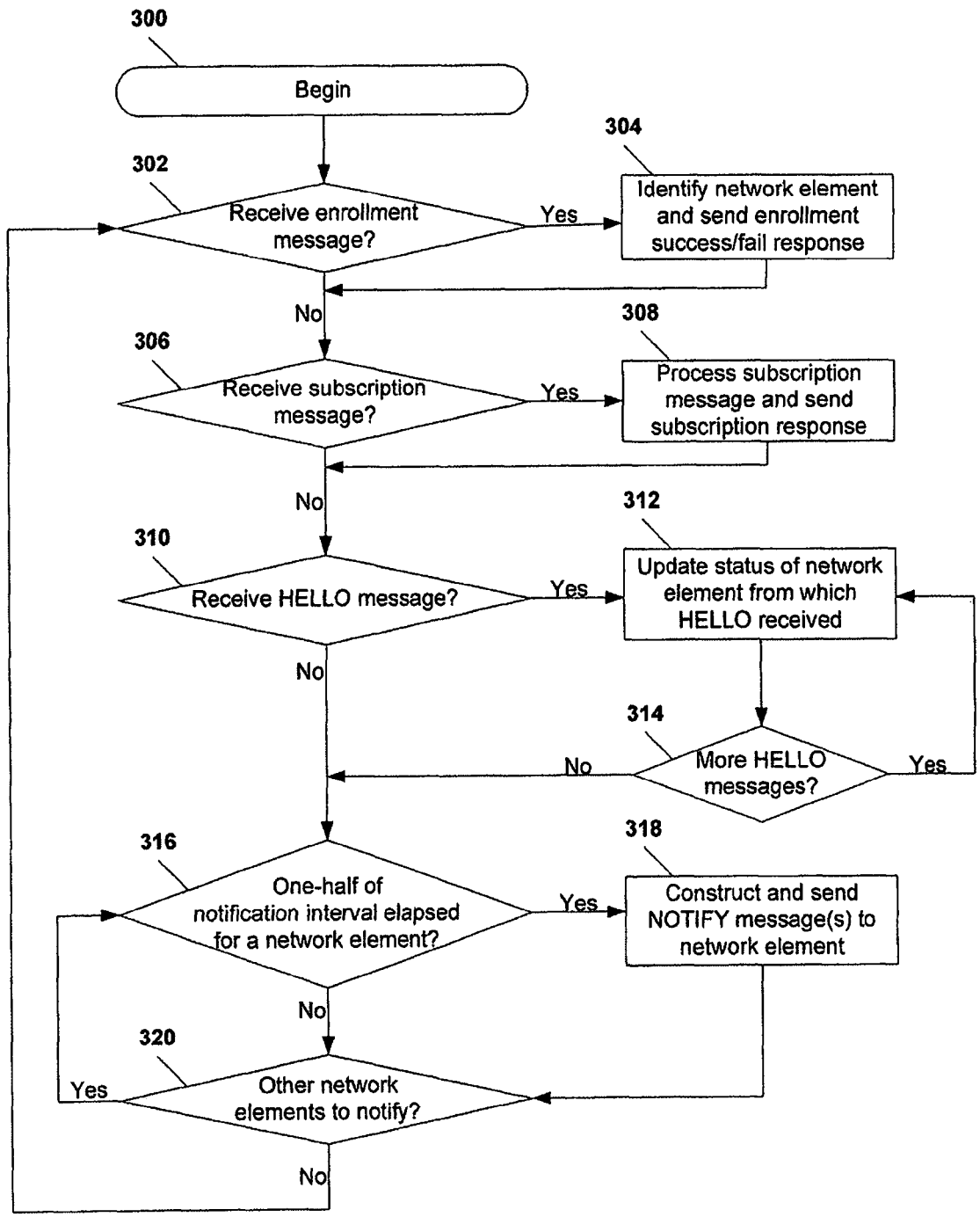
FIG. 3 is a flow chart of a particular embodiment of a method of health monitoring and fault mitigation in a network system.

In an illustrative non-limiting embodiment, on generating a notification message, the notification module 216 is executable by the processing logic 204 to send the notification message to each service monitor registered in a service monitor list after one-half (½) of a notification interval associated with each service monitor has elapsed. For each service monitor object, the notification module 216 can be executable by the processing logic 204 to loop through each service application group object stored within a list of monitored services. Further, for each service application group, the notification module 216 can be executable by the processing logic 204 to loop through each service application in a list of service applications and to populate the following information required in the notification message based on the corresponding information from the service application object:

Application name (NOTIFY) := serviceAppl::applicationInstance
Application instance FQDN (NOTIFY) := serviceAppl::applicationFQDN
Application instance IP address (NOTIFY) :=
    serviceAppl::applicationIPaddress
mostRecentHbTime (NOTIFY) := serviceAppl:mostRecentHbTime
secondRecentHbTime (NOTIFY) := serviceAppl::secondRecentHbTime
thirdRecentHbTime (NOTIFY) := serviceAppl::secondRecentHbTime Referring to FIG. 3, a particular embodiment of a method of health monitoring and fault mitigation in a network system is illustrated. The method begins at 300. At decision node 302, a heartbeat manager determines whether it has received an enrollment message from a network entity, such as a network entity that has been added to a server clustering system or network. In an illustrative embodiment, an enrollment message can include information indicating the name of a service application running at the network entity, a service that the application provides, an application class associated with the service application, an application instance fully qualified domain name (FQDN), an application instance IP address, a proposed heartbeat interval at which the operational status of the service application is to be obtained or determined by the heartbeat manager, or any combination thereof.

If the heartbeat manager determines that it has not received an enrollment message from a network entity, the method moves to decision node 306. Conversely, if an enrollment message has been received, the method proceeds to block 304. At block 304, the heartbeat manager identifies the network element based on the enrollment message and sends a response indicating whether enrollment has succeeded or failed. The method then proceeds to decision node 306. In an illustrative embodiment, a successful enrollment response can include an identification of the heartbeat manager and a heartbeat interval at which the network entity is to report operational status to the heartbeat manager.

Proceeding to decision node 306, the heartbeat manager can determine whether it has received a subscription message from a network entity. A subscription message can be received from a network entity in response to a successful enrollment message sent at block 304 or from another network entity that was previously enrolled with the heartbeat manager. A subscription message can indicate the name of a service application at another server, or a class of applications running within the server clustering system or network, to be monitored on behalf of a heartbeat agent application running at the network entity from which the subscription message was received.

If the heartbeat manager has not received a subscription message, the method advances to decision node 310. On the other hand, if the heartbeat manager has received a subscription message, the method moves to block 308. At block 308, the heartbeat manager processes the subscription message and sends a subscription response to the network entity from which the subscription message was received. The method can then proceed to decision node 310. In an illustrative embodiment, the subscription response message can indicate that the subscription succeeded and indicate a heartbeat interval at which the operational status of a service application identified in the subscription request will be reported to the network entity.

At decision node 310, the heartbeat manager determines whether it has received a HELLO message or other operational status message from a network entity. If the heartbeat manager receives an operational status message, the method proceeds to block 312, and the heartbeat manager updates the status of the network element from which the HELLO message was received. For example, the heartbeat manager can maintain a log of operational status messages for each enrolled network element, where the log indicates whether operational status messages were received and at what times or intervals. Moving to decision node 314, the heartbeat manager can determine whether it has received additional HELLO messages. If the heartbeat manager has received additional HELLO messages, the method returns to block 312, and the heartbeat manager can update the status of the network element from which each HELLO message was received.

Continuing to decision node 316, the heartbeat manager determines whether one-half of a notification interval has elapsed for a network element communicating with the heartbeat management system. If the heartbeat manager determines that a notification interval has been reached for a network element, the method moves to block 318, and the heartbeat manager can generate and send one or more notification messages to the network element based on a notification rule associated with the network element or an application stored at the network element. Each notification message indicates whether an operational status message related to an application at another network element has been received at one or more heartbeat intervals. At decision node 320, the heartbeat manager can determine whether it is to notify additional network elements. If so, the method returns to decision node 316, and the heartbeat manager can determine whether notification intervals associated with such network elements have occurred. If the heartbeat manager determines that there are no additional network elements to notify, the method returns to decision node 302.

Figure 4:
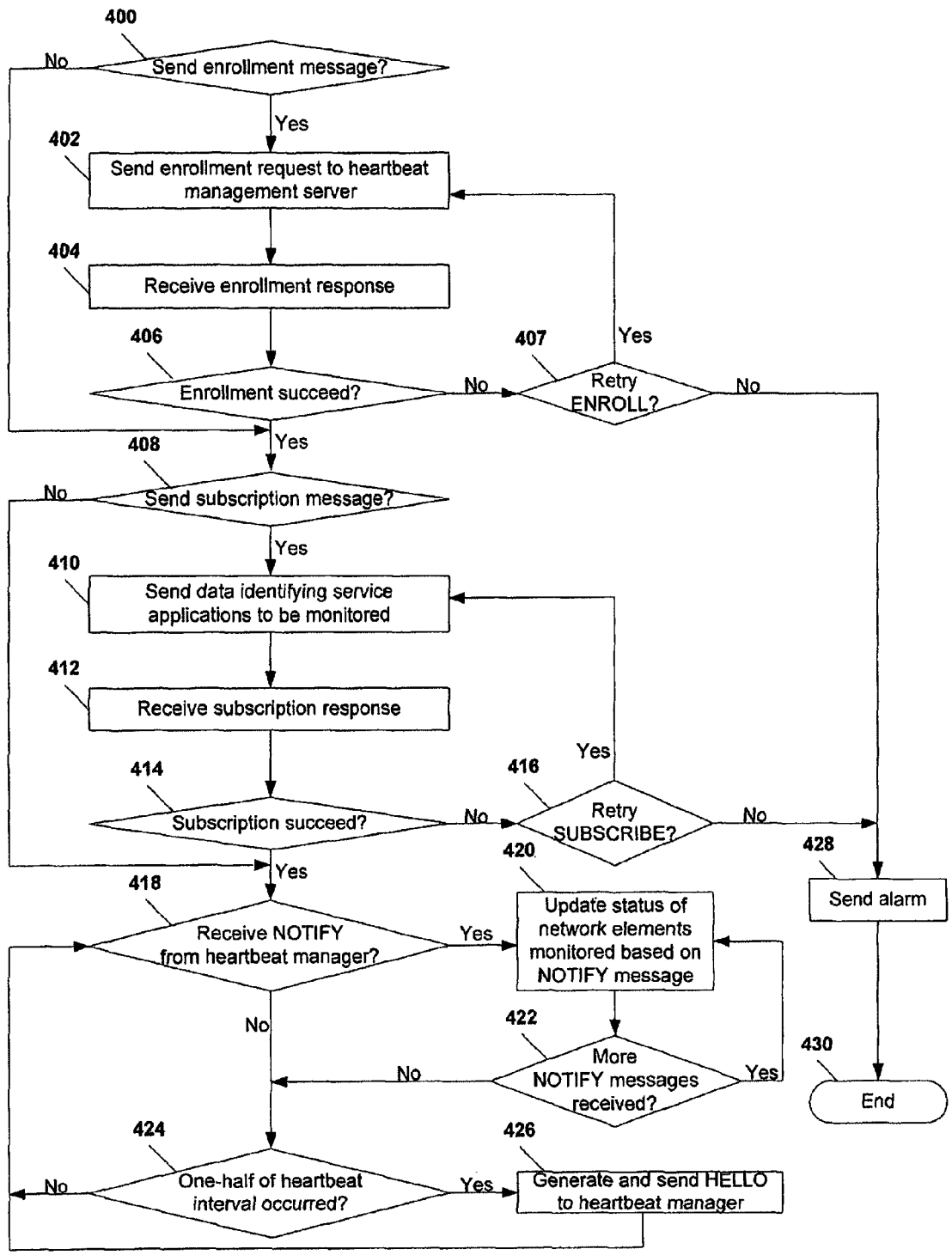
FIG. 4 is a flow chart of a second particular embodiment of a method of health monitoring and fault mitigation in a network system.

Referring to FIG. 4, a second embodiment of a method of health monitoring and fault mitigation in a network system is illustrated. At decision node 400, a heartbeat agent at a network element determines whether it is to send an enrollment request to a heartbeat management system communicating with the network. If the heartbeat agent is not to send an enrollment message (e.g., if it is already enrolled) the method can proceed to decision node 408. On the other hand, if the heartbeat agent determines that it is to send an enrollment message, the method moves to block 402, and the a heartbeat agent sends an enrollment message to the heartbeat management system. Moving to block 404, the heartbeat agent receives an enrollment response from the heartbeat management system. Proceeding to decision node 406, the heartbeat agent can determine whether the enrollment has succeeded.

If the enrollment has not succeeded, the method moves to decision node 407, and the heartbeat agent can determine whether to retry the enrollment request. If the heartbeat agent determines to retry the request, the method returns to block 402. In a particular embodiment, if the heartbeat agent determines not to retry the request, the method proceeds to 428, and the heartbeat agent sends an alarm to a fault management system, for example. In an illustrative, non-limiting embodiment, a network operator can identify and repair a fault at the heartbeat management system or other network element. The method can then terminate at 430.

Returning to decision node 406, if the enrollment is successful, the method continues to decision node 408, and a heartbeat monitor associated with the heartbeat agent at the network element determines whether it is to send a subscription message to the heartbeat management system. If the heartbeat monitor determines that it is not to send a subscription message to the heartbeat management system, the method can proceed to decision node 418. On the other hand, if the heartbeat monitor determines that it is to send a subscription message to the heartbeat management system, the method continues to block 410, and the heartbeat monitor sends subscription data identifying one or more other service applications, or class of applications, whose operational status is to be reported to the heartbeat monitor by the heartbeat management system. Advancing to block 412, the heartbeat monitor can receive a subscription response message from the heartbeat management system.

At decision node 414, the heartbeat monitor determines whether the subscription succeeded. If the subscription has not succeeded, the method can proceed to decision node 416, and the heartbeat monitor can determine whether to retry the subscription request. If the heartbeat monitor retries the subscription request, the method returns to block 410. Whereas, if the heartbeat monitor does not retry the subscription request, the method can move to block 428. Returning to decision node 414, if the subscription request succeeds, the method continues to decision node 418, and the heartbeat monitor determines whether it has received a notification message from the heartbeat management system. If the heartbeat monitor has not received a notification message, the method can continue to decision node 424. On the other hand, if the heartbeat monitor has received a notification message, the method moves to block 420, and the heartbeat monitor can update the status of one or more network elements monitored by the heartbeat monitor based on the notification message. The method can then advance to decision node 422, and the heartbeat monitor can determine whether additional notification messages are received. If so, the method can return to block 420. Otherwise, the method can move to decision node 424.

Moving to decision node 424, the heartbeat agent determines whether one-half of a heartbeat interval has elapsed since a previous HELLO message was sent (or since enrollment, in the case of a first HELLO message). If one-half of the heartbeat interval has not elapsed, the method can return to decision node 418. On the other hand, if one-half of the heartbeat interval has elapsed, the method proceeds to block 426, and the heartbeat agent can generate and send a HELLO message or other operational status message to the heartbeat management server. The method can then return to decision node 418.

The methods disclosed herein have been presented in particular embodiments for ease of explanation. In other embodiments, aspects of the methods can be performed in various sequences or simultaneously. For instance, network entities can receive notifications indicating operational status of other network entities at any time after sending a subscription message to the heartbeat management server indicating that such network entities are to be monitored on behalf of the subscribing network entity or a heartbeat monitor associated with the subscribing network entity. A heartbeat agent and a heartbeat monitor can represent separate computer programs, physical elements, or any combination thereof, at a network entity. Alternatively, the heartbeat agent and heartbeat monitor can represent processes performed by a single computer program, operating system, or hardware module at a network entity.

Figure 5:
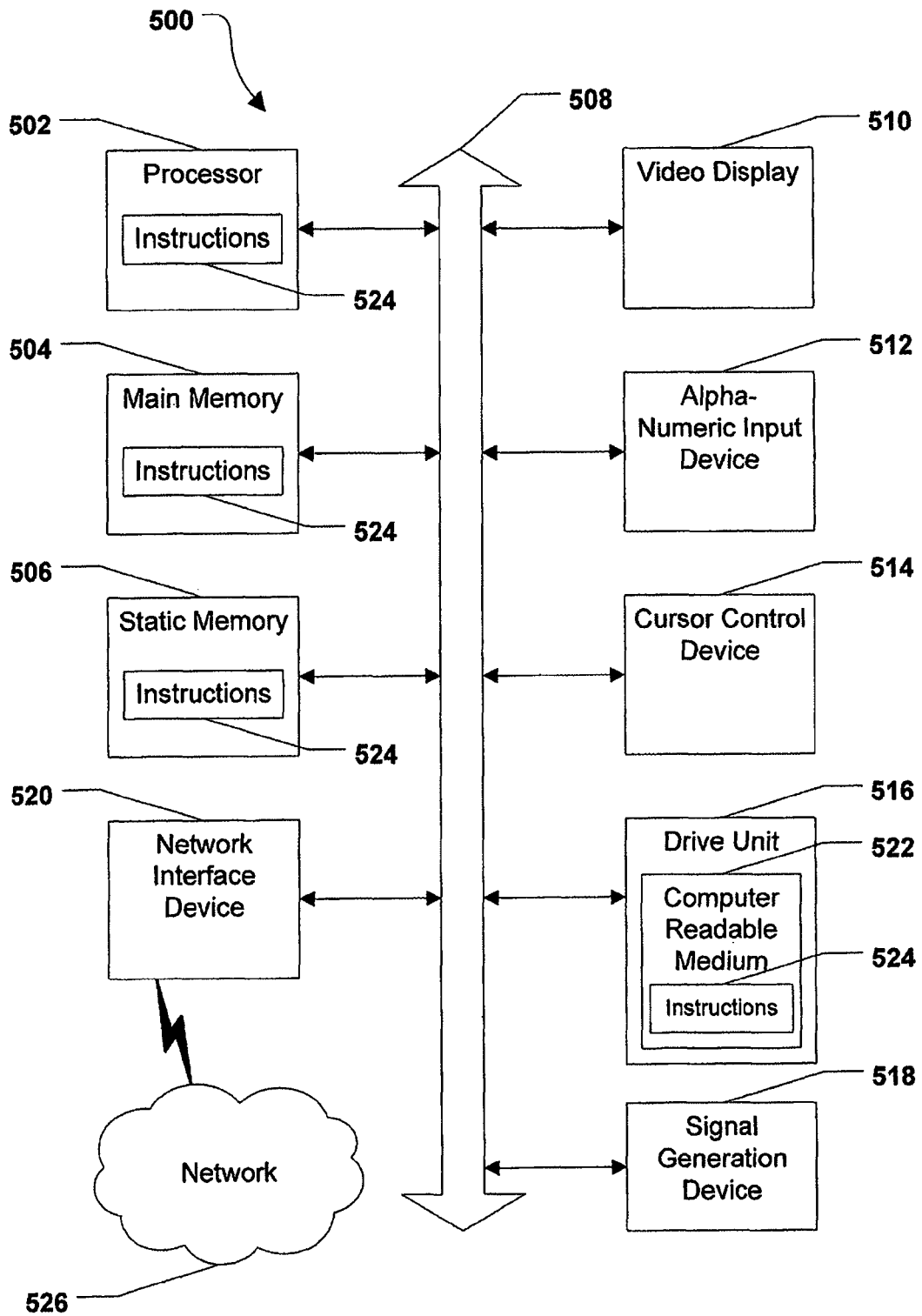
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices, such as a heartbeat management server, a SIP or other application server, or other servers, systems or network entities, as illustrated in FIGS. 1A, 1B, and 2.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid-state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of health monitoring and fault mitigation in a network system, the method comprising:
   receiving an enrollment message at a heartbeat manager from a heartbeat agent associated with a first application stored at a first network entity;
   automatically assigning a heartbeat interval to the first application at the heartbeat manager, wherein the heartbeat interval is based at least partially on a proposed heartbeat interval included in the enrollment message;
   sending an enrollment response message from the heartbeat manager to the first application, wherein the enrollment response message indicates the assigned heartbeat interval;
   prompting the heartbeat agent for operational status of the first application when a heartbeat signal is not received during the assigned heartbeat interval for the first application; and
   receiving a subscription request from a heartbeat monitor of the first application at the heartbeat manager, wherein the subscription request indicates a service to be monitored on behalf of the first application.

2. The method of claim 1, further comprising identifying a type of the first network entity.

3. The method of claim 1, wherein the enrollment response message to the first application indicates that the first application has been enrolled at the heartbeat manager.

4. The method of claim 1, wherein the enrollment response message is sent to the heartbeat monitor of the first application.

5. The method of claim 4, further comprising:
   receiving the heartbeat signal from the heartbeat agent, wherein the heartbeat signal indicates that the first application is operational; and
   updating an operation status associated with the first application.

6. The method of claim 5, further comprising sending a notification to a second application at a second network entity, wherein the notification indicates that the first application is operational.

7. The method of claim 1, further comprising assigning a notification rule to the first application based at least partially on the subscription request.

8. The method of claim 7, wherein the subscription request indicates a second application to be monitored and wherein the second application resides at a second network entity.

9. The method of claim 8, further comprising:
receiving a second heartbeat signal from a second heartbeat agent associated with the second application; and
sending a notification to the heartbeat monitor based on the notification rule, wherein the notification indicates that the second application is operational.

10. The method of claim 8, further comprising:
not receiving a second heartbeat signal from a second heartbeat agent associated with the second application; and
sending a notification to the heartbeat monitor, wherein the notification indicates that the second application is not operational.

11. A method of health monitoring and fault mitigation in a network system, the method comprising:
sending an enrollment request from a first application on a network entity to a heartbeat management system, the enrollment request including a proposed heartbeat interval, wherein the enrollment request indicates a name of the first application, a service with which the first application is associated, and a class of the first application;
receiving, at the first application on the network entity, an enrollment response from a heartbeat manager associated with the heartbeat management system, wherein the enrollment response indicates a heartbeat interval assigned to the first application, wherein the heartbeat interval is based at least partially on the proposed heartbeat interval included in the enrollment request; and
sending a subscription request from the first application to the heartbeat manager, wherein the subscription request indicates a particular service to be monitored on behalf of the first application, the particular service including a second application that resides at a second network entity.

12. The method of claim 11, wherein the enrollment request is sent by a heartbeat agent associated with the first application.

13. The method of claim 11, wherein the enrollment request includes at least one of an application instance fully qualified domain name, an application instance internet protocol address, and an enrollment action.

14. The method of claim 11, wherein the heartbeat management system sends a notification of an operational status of the first application to a third application.

15. The method of claim 11, further comprising receiving a notification from at least one heartbeat manager associated with the heartbeat management system, wherein the notification indicates whether the second application is operational.

16. The method of claim 15, wherein the notification indicates that a heartbeat signal has been received from the second application at the at least one heartbeat manager at one or more previous heartbeat intervals.

17. The method of claim 11, further comprising monitoring time for the heartbeat interval.

18. The method of claim 11, further comprising sending a heartbeat signal from the network entity to the heartbeat manager after one-half of the heartbeat interval has elapsed since a previous heartbeat signal was sent from the network entity, wherein the heartbeat signal indicates that the first application is operational.

19. A system, comprising:
a heartbeat manager having processing logic and memory accessible to the processing logic wherein the memory includes:
instructions executable by the processing logic to receive a subscription message from a heartbeat monitor associated with a first application, wherein the subscription message indicates at least one class of other applications to be monitored on behalf of the first application;
instructions executable by the processing logic to automatically, without receipt of additional input from the heartbeat monitor and the first application, notify the first application of an operational status of each other application included in the at least one class of other applications after each instance of a notification interval associated with the first application; and
instructions executable by the processing logic to receive an enrollment request from a heartbeat agent associated with the first application and to automatically enroll the first application with a service associated with the heartbeat manager.

20. The system of claim 19, wherein the memory includes a non-volatile data store to store permanent data including a service dictionary comprising a list of services, wherein each of the services points to a list of enrolled service applications and a list of subscribed service applications.

21. The system of claim 19, wherein the memory includes:
instructions executable by the processing logic to receive a plurality of heartbeat signals from heartbeat agents associated with a plurality of applications residing at a plurality of network entities, wherein the plurality of applications are members of a first class of the at least one class, wherein each heartbeat signal indicates that an application stored at one of the plurality of network entities is operational; and
instructions executable by the processing logic to send at least one notification message to the heartbeat monitor, wherein each notification message indicates an operational status of at least one application of the first class.

22. The system of claim 21, wherein the memory includes instructions executable by the processing logic to monitor time for notification intervals associated with heartbeat monitor.

23. The system of claim 22, wherein the memory includes instructions executable by the processing logic to send a particular notification message to the heartbeat monitor after one-half of an associated notification interval has elapsed since a previous notification was sent to the heartbeat monitor.

24. The system of claim 19, wherein the memory includes instructions executable by the processing logic to communicate with the heartbeat monitor via one of a plurality of heartbeat managers.

25. The system of claim 19, wherein each other application included in the at least one class of other applications is enrolled with the service.

26. A non-transitory computer-readable storage medium comprising processor-readable instructions adapted to cause a processor to:
enroll a first application residing at a network entity with a heartbeat management service in response to an enrollment request received from a heartbeat agent associated with the first application;
prompt the heartbeat agent for operational status of the first application when a heartbeat signal for the first application is not received during a heartbeat interval associated with the first application;
monitor a class of other applications in response to a subscription message received from a heartbeat monitor associated with the first application, wherein the subscription message indicates that the class of other applications is to be monitored on behalf of the first application; and send operational status information of each member in the class of other applications to the first application from the heartbeat management service after each occurrence of a notification interval associated with the first application.

27. The non-transitory computer-readable storage medium of claim 26, wherein the processor-readable instructions are adapted to cause the processor to receive a second heartbeat signal from a second heartbeat agent associated with at least one member of the class of other applications.

28. The non-transitory computer-readable storage medium of claim 27, wherein the processor-readable instructions are adapted to cause the processor to notify the heartbeat monitor associated with the first application that at least one member of the class of other applications is operational.

* * * * *